May 10, 1966  N. E. ELSAS  3,250,164
FABRIC CUTTING APPARATUS
Filed March 18, 1963  2 Sheets-Sheet 1
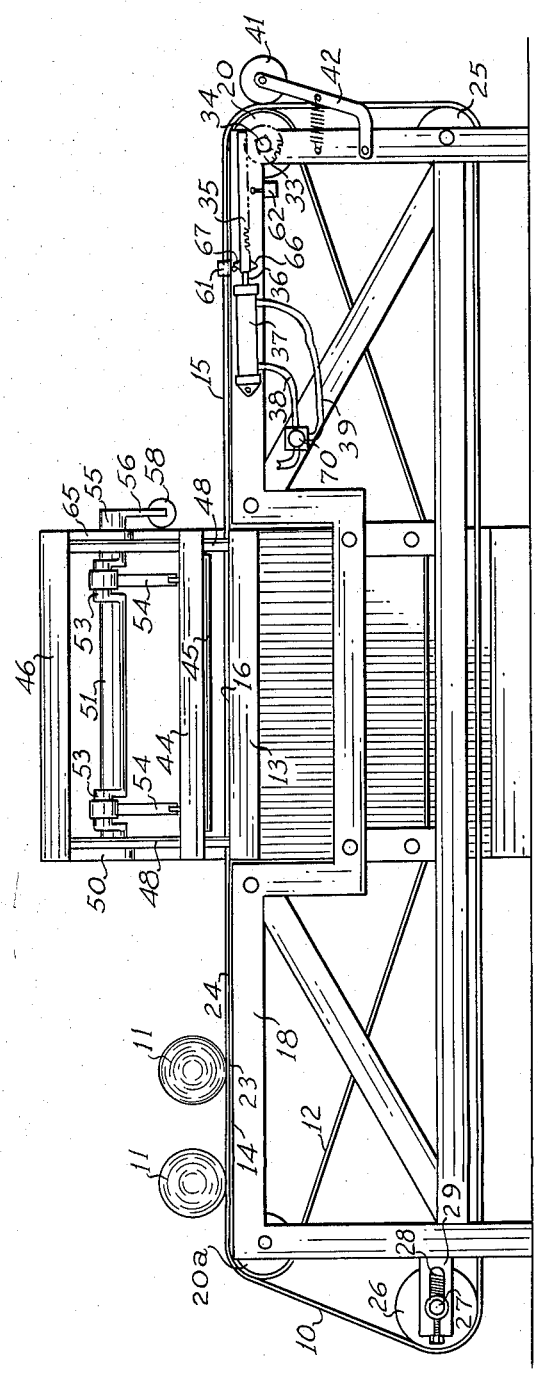
INVENTOR.
Norman E. Elsas
BY
Newton, Hopkins & Jones
ATTORNEYS

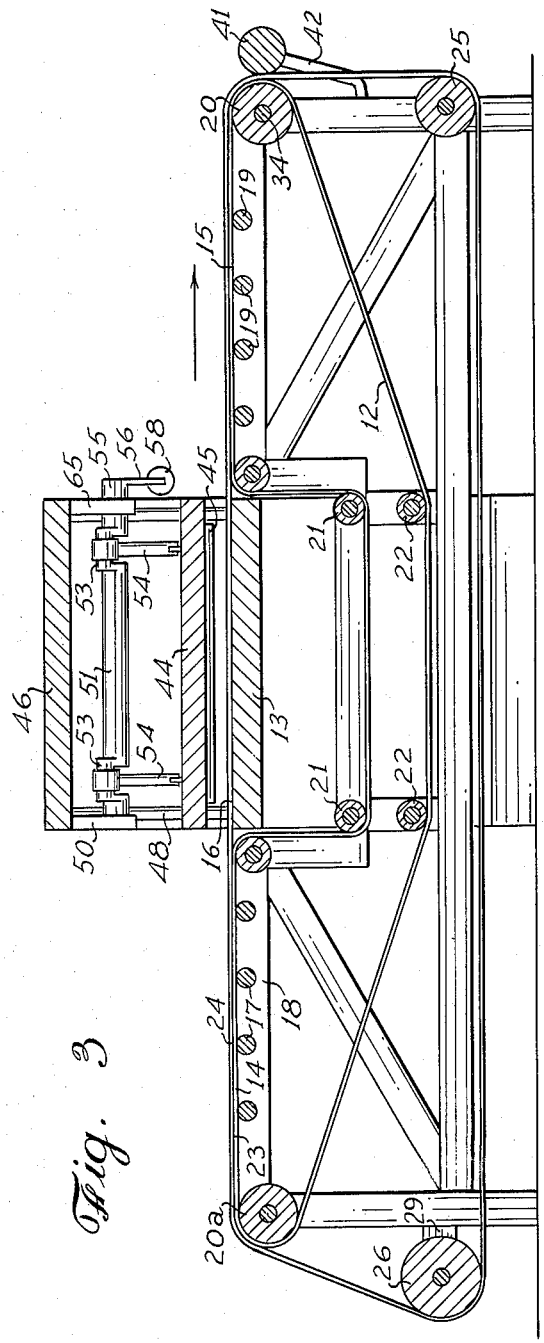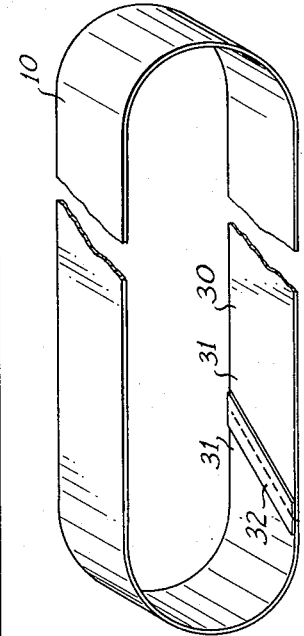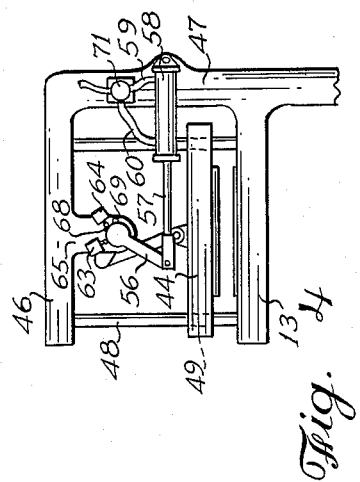
INVENTOR.
Norman E. Elsas

United States Patent Office 3,250,164
Patented May 10, 1966

1

3,250,164
FABRIC CUTTING APPARATUS
Norman E. Elsas, 3081 Maple Drive NE., Atlanta, Ga.
Filed Mar. 18, 1963, Ser. No. 265,613
3 Claims. (Cl. 83—155)

This invention relates to fabric cutting apparatus, and more particularly to apparatus for automatically and repeatedly cutting a fabric pattern for an article such as clothing from a multi-layered arrangement of fabric in such a manner that each cutting operation produces a plurality of the fabric patterns and the repeated cutting operations and the positioning of the fabric for cutting occur automatically.

The mass production of garments and other similar articles made of fabric requires that an identical fabric pattern be cut from a larger piece of fabric a plurality of times. This usually involves cutting the fabric pattern from a roll of fabric and is most efficiently accomplished by placing a plurality of layers of the fabric together and cutting the fabric pattern simultaneously from all layers of the fabric. This is difficult to do by hand because when many layers of the fabric are placed together they become cumbersome to handle and because it requires great pressure to cut through a plurality of layers of fabric material.

Accordingly, various types of apparatus have been devised for positioning and cutting fabric patterns from fabric. These previous types of apparatus have generally employed some means for moving the fabric into a cutting area, for mechanically cutting a plurality of fabric patterns from a plurality of layers of the fabric, and for removing the waste fabric and the fabric patterns from the cutting area. These previous devices are not wholly satisfactory for automatically cutting fabric patterns from many types of fabric and are completely unsatisfactory for cutting fabric patterns from fabric which tends to stretch.

This is because they pull the fabric into the cutting area or stretch the fabric while it is in the cutting apparatus. The result is that the fabric is stretched when the pattern is cut and the final shape of the fabric pattern is distored by the amount the material is stretched.

The fabric pattern cutting apparatus described herein cuts any desired fabric pattern from both stretchable and non-stretchable fabric. The invention moves the fabric to and from a cutting means and positions it within the cutting means without stretching or other distortion of the fabric. Moreover, automatically it initiates the cutting operation only when the fabric is properly positioned and it repeatedly position and cuts a plurality of layers of the fabric. Thus, it is adapted to the mass production of fabric patterns from either stretchable or non-stretchable fabric.

This apparatus moves the fabric from which a fabric pattern is to be cut, from and through a cutting means on a conveyor belt of "cut-out" paper or similar material which is supported on either side of the cutting means by a supporting belt of conventional webbing or similar material and in the cutting means by the cutting means itself. The fabric is carried by the conveyor belt throughout the apparatus and the fabric is never pulled, shoved or otherwise distorted. The motion of the conveyor belt and the operation of the cutting means are coordinated so that the conveyor belt places a new length of the fabric in the cutting means after each cutting operation has occurred and before the next cutting operation automatically occurs. Moreover, the relationship between the motion of the conveyor belt and the motion of the supporting belt is such that a slightly different segment of the conveyor belt will be in the cutting means each time a cutting operation occurs. During a period of operation of the apparatus, this will distribute the impact of the cutting means over the entire surface of the conveyor belt and substantially increase the life of the material used in the conveyor belt by preventing the same portions of the conveyor belt from being repeatedly subjected to the impact of the cutting as fabric cutting occurs.

These and other features and advantages of the invention will be more clearly understood from the following detailed description and the accompanying drawings in which like characters of reference designate corresponding parts in all figures and in which:

FIG. 1 is a side elevational view of the fabric pattern cutting apparatus.

FIG. 2 is a top plan view of fabric extending along a portion of the length of the conveyor belt and showing the fabric as it appears when cut into fabric patterns by the fabric pattern cutting apparatus.

FIG. 3 is a sectional view of the fabric pattern cutting apparatus taken at a plane perpendicular to the bed of the apparatus so as to remove one side of the apparatus and show the roller arrangement used to carry the conveyor belt and the supporting belt.

FIG. 4 is an enlarged front elevational view of the fabric cutting portion of the fabric pattern cutting apparatus.

FIG. 5 is a perspective view of the conveyor belt of the fabric pattern cutting apparatus.

These figures and the following detailed description disclose the preferred specific embodiment of the invention, but the invention is not limited to the details disclosed since it may be embodied in other equivalent forms.

This invention is best understood by considering it to be comprised of a conveyor belt 10 which carries the fabric 11 from which a fabric pattern is to be cut throughout the length of the apparatus, a supporting belt 12 which imparts motion to the conveyor belt 10 and aids the conveyor belt 10 in supporting the weight of the fabric 11, a fabric cutting means which cuts the fabric pattern from the fabric 11 and whose anvil 13 aids the conveyor belt 10 in supporting the weight of the fabric 11 in the cutting means, and an indexing means for controlling and coordinating the motion from the conveyor belt 10 and the cutting action of the cutting means so as to accomplish the most efficient cutting and utilization of the fabric for a particular fabric pattern. In the specific embodiment of the invention chosen to illustrate the invention, the fabric 11 from which the fabric pattern is to be cut is moved along the length of a horizontal bed. The horizontal bed is formed by a first segment or feed area 14 and a second segment or retrieving area 15 of the supporting belt 12 and the flat, horizontal cutting surface or area 16 of the anvil 13 of the cutting means. The anvil 13 is positioned between the two segments 14 and 15 of the supporting belt 12 and the supporting belt is of any suitable material such as webbing or certain types of plastic material.

The first segment or feed flight 14 of the supporting belt 12 is maintained in the same horizontal plane as the cutting surface 16 of the anvil 12 by a plurality of feed rollers 17 extending between two vertically positioned rectangular frames 18. The second segment or retrieving flight 15 of the supporting belt 12 is maintained in the same plane by a plurality of discharge rollers 19 also extending between the two rectangular frames 18. The supporting belt 12 is continuous and passes over the feed rollers 17 and discharge rollers 19, around corner rollers 20 extending between the upper ends of the two rectangular frames 18, and under diverting rollers 21 which pass it under the anvil 13 of the cutting means for its departure flight as it moves from its first segment 14 position to its second segment 15 position. The supporting belt 12 also passes under two return rollers 22 during its return flight which maintain tension in the supporting belt 12 and guide its return path beneath the bed.

The conveyor belt 10 is also continuous and positioned for motion between the two rectangular frames 18. The conveyor belt 10 encompasses the supporting belt 12, and extends the length of the bed formed by the anvil 13 and the two segments 14 and 15 of the supporting belt 12. The underside 23 of the conveyor belt 10 is in contact with the upper side 24 of the supporting belt 12 throughout its feed flight or that length of the horizontal bed formed by the first segment 14 and in its retrieving flight or the second segment 15 of the supporting belt 12. Since the conveyor belt 10 passes over the anvil 13 during its cutting flight, it does not pass under the diverting rollers 21, and in order that its tension may be adjusted independently of the tension of the supporting belt 12, the conveyor belt 10 passes under the return roller 25 and the adjustment roller 26 during its return flight rather than under the return rollers 22. The axle 27 of the adjustment roller 26 slides in slots 28 in ears 29 extending from the rectangular frames 18 and is urged in the slot by springs 29 in that direction which maintains tension in the conveyor belt 10.

The result of this arrangement of the conveyor belt 10 and the supporting belt 12 is that the supporting belt 12 passes along the length of the horizontal bed by passing under the anvil 13 and the conveyor belt 10 passes along the length of the horizontal bed by passing over the anvil 13.

Linear motion along the length of the horizontal bed is imparted to the conveyor belt 10 by the supporting belt 12. The contact between the underside 23 of the conveyor belt 10 and the upper side 24 of the supporting belt 12 as they pass together along a portion of the length of the horizontal bed and around the corner rollers 20 is sufficient for the supporting belt 12 to pull the conveyor belt 10 along with it. Except when it passes alone over the anvil 13, the conveyor belt 10 is in essence carried and supported along the length of the horizontal bed by the supporting belt 12. As a result, it is principally the strength of the supporting belt 12 which supports and pulls fabric 11 along the length of the horizontal bed.

This permits the conveyor belt 10 to be made of material which does not itself have the strength to support and draw fabric along the entire length of the horizontal belt. Rather, it is made of material having properties desirable for a belt continuously exposed to the impact of a cutting edge such as that of a fabric cutting means. Among these properties are a substantially uniform thickness which insures by a uniformly level surface under the fabric 11 to be cut, a hard surface resistant to damage from the impact of a cutting edge, and sufficiently low cost to permit the belt to be frequently discarded when damage from the cutting edge becomes excessive.

It has been found that paper, such as that paper commonly known as "cut-out" paper 30, has these properties and makes an excellent conveyor belt 10. A length of the "cut-out" paper 30 equal to the length of the conveyor belt 10 is removed from a roll and after positioning on the fabric pattern cutting apparatus, its ends 31 are joined at an angle or bias with a piece of tape 32. The tape 32 is of the known thermo-setting type and when applied to the ends of the conveyor belt with heat provides a joint stronger than the belt material. The paper 30 is inexpensive and new conveyor belts 10 can be easily and economically placed on the fabric pattern cutting apparatus as often as they become scored by a cutting edge.

The joining of the ends of the conveyor belt 10 at a bias insures that both ends of the conveyor belt 10 are engaged by the supporting belt 12 as this joint area of the conveyor belt 10 is engaged and disengaged by the supporting belt 12. This prevents undue strain on the conveyor belt 10 joint and possible pulling of the ends of the conveyor belt 10 apart as the joint area is engaged by the conveyor belt 10. Moreover, the joining of the ends of the conveyor belt 10 at a bias spreads the joint along the length of the conveyor belt 10 and prevents the entire joint from being subjected at the same time to the action of the cutting edge of a fabric cutting means. This increases the life of the conveyor belt 10.

The frequency at which the conveyor belt 10 must be changed because of excessive scoring is also reduced because the conveyor belt 10 and supporting belt 12 have different lengths. This results in a slightly different portion of the conveyor belt 10 passing with the same portion of the supporting belt 12 along the horizontal bed each time that portion of the supporting belt 12 passes along the length of the horizontal bed. The placing of fabric 11 on the horizontal bed and the action of the fabric cutting means is indexed to the motion of the supporting belt 12 and the continuous shifting of the conveyor belt 10 relative to the supporting belt 12 results in the segment of the conveyor belt 10 placed in the fabric cutting means being continuously changed, and in the entire length of the conveyor belt 10 being exposed to the action of the cutting edge. This prevents the cutting edge from repeatedly scoring the same spots on the conveyor belt 10 so as to quickly destroy it.

Linear motion is imparted to the supporting belt 12 by attaching a ratchet wheel 33 to the extending end of the axle 34 of the corner roller 20 adjacent to the discharge rollers 19, and by rotating this ratchet wheel 33 with a ratchet 35 formed at the end of a plunger 36 extending from a double acting air piston 37 which is fixedly mounted on the rectangular frame 18. The ratchet wheel 33 is arranged to act as a unidirectional clutch in the known manner by placing bearings between it and the axle 34. These bearings are wedged between the axle 34 and the ratchet wheel 33 when the ratchet wheel 33, as viewed in FIGURE 1, is rotated clockwise and the axle 34 and corner roller 20 are rotated by the rotation of the ratchet wheel 33. On the other hand, rotation of the ratchet wheel 33 in the opposite direction will not force the bearings against the axle 34 and the ratchet wheel 33 will not rotate the axle 34 and the corner roller 20. The ratchet 35 is driven toward the corner roller 20 by introducing air into the piston 37 through the air lead 38 and is moved in the opposite direction by introducing air into the piston 37 through the air lead 39. Thus, the introduction of air into the piston 37 through air lead 38 will rotate the corner roller 20 clockwise, and introduction of air into the piston 37 through air lead 39 will simply return the ratchet 35 and ratchet wheel 33 to their original positions.

Each time the piston 37 moves the ratchet 35 toward and away from the corner roller 20, the corner roller 20 rotates and advances the support belt 12 a distance determined by ratchet 35 travel. The length of supporting belt 12 travel with each operation of the piston 37 is selected to place a new length of the fabric 11 within the area 40 of the anvil 13. More specifically, it is selected to advance fabric 11 carried on the conveyor belt 10 that distance necessary to place the next unit of fabric 11 in the fabric cutting means after each cutting operation has occurred. The distance the supporting belt advances can be set to provide the most efficient utilization of the fabric 11.

A pressure roller 41 is positioned adjacent to the corner roller 20 and presses the supporting belt 12 against the corner roller 20 to prevent slippage between the corner roller 20 and the supporting belt 12 as the corner roller 20 rotates. This insures that the rotation of the corner roller 20 is directly related to the linear motion of the supporting belt 12.

The pressure roller 41 is pivotally mounted at the end of a lever 42 pivoted from the rectangular frame 18. It is pulled toward the corner roller 20 by a spring 43 extending between the lever 42 and the rectangular frame 18.

Any suitable device may be used as the fabric cutting means in the apparatus. However, the fabric cutting means shown in the drawings possesses the advantage of simultaneously cutting many layers of fabric without flywheels or other complicated and expensive components. It is comprised of a pressure plate 44 carrying a steel rule die 45 embodied in known manner in its surface. The steel rule die 45 has the configuration of the fabric pattern which is being cut from the fabric 11 and each time the pressure plate 44 is lowered, the steel die cuts through the fabric 11 and engages the surface of the conveyor belt 10.

The pressure plate 44 is mounted for vertical motion between the anvil 13 and a top plate 46 extending horizontally from a vertical support 47, by extending a plurality of vertical rods 48 between the anvil 13 and the top plate 46 and through holes 49 in the pressure plate 44. Tabs 50 and 65 extend down from the top plate 46 and a crank shaft 51 is extended between and through holes 52 in the tabs 50 and 65. The crank shaft 51 has two crank pins 53, and a rod 54 extends from each crank pin 53 to the pressure plate 44. The crank pins 53 have identical radial positions on the crank shaft 51, and the rods 54 are of equal length. Thus, as the crank shaft 51 is rotated, the crank pins 53 and rods 54 will uniformly raise and lower the pressure plate 44.

Rotation of the crank shaft 51 is achieved by fixedly attaching a collar 55 to one extending end of the crank shaft 51 and by extending a link 56 from the collar 55 to the extending end of the plunger 57 of an air piston 58 fixedly mounted on the vertical support 47. The air piston 58 is double acting, and when air is introduced into the air piston 58 through air lead 59, the plunger 57 extends and rotates the crank shaft 51 clockwise, as viewed in FIGURE 4, to raise the pressure plate 44. When air is introduced in the air piston 58 through air lead 60, the plunger 57 is drawn into the air piston 58 and the crank shaft 51 rotates counterclockwise to lower the pressure plate 44 and cut the fabric 11 on the anvil 13.

The operation of the piston 37 and air piston 58 is coordinated so that the conveyor belt 10 advances a new length of fabric 11 over the anvil 13 after each lowering of the pressure plate 44. A micro-switch 61 and a micro-switch 62 are mounted on the rectangular frame 18 adjacent to the ratchet 35, and a micro-switch 63 and a micro-switch 64 are mounted on the tab 65 adjacent to the collar 55.

A switch actuator 66 on the ratchet 35 engages the micro-switch 62 when the plunger 36 is fully extended, and a switch actuator 67 on the ratchet 35 engages the micro-switch 61 when the plunger 36 is withdrawn into the piston 37. Similarly, a switch actuator 68 on the collar 55 engages the micro-switch 64 when the collar 55 and crank shaft 51 are in that rotational position which raises the pressure plate 44, and a switch actuator 69 on the collar 55 engages micro-switch 63 when the collar 55 and the crank shaft 51 are in that rotational position which places the steel rule die 45 in contact with the conveyor belt 10.

The introduction of air in the air piston 37 through air leads 38 and 39 from any convenient source of air under pressure is controlled by a solenoid operated valve 70, and the introduction of air into the air piston 58 through air leads 59 and 60 from a similar source of air is controlled by a solenoid operated valve 71. The valves 70 and 71 and the micro-switches 61, 62, 63 and 64 are connected by an appropriate electrical circuit, and when the micro-switch 62 is operated by actuator 66, the valve 70 shifts air from air lead 38 to air lead 39, and the valve 71 introduces air into air lead 60. This causes the ratchet 35 to be withdrawn and the pressure plate 44 to be lowered to cut the fabric.

When the micro-switch 61 is engaged by the actuator 67, the valve 70 discontinues the introduction of air into air lead 39 and the piston 37 is ready to operate again. When the micro-switch 63 is engaged by the actuator 69, air is shifted by the valve 71 from the air lead 59 to the air lead 60, and the pressure plate 44 is raised. As the pressure plate 44 raises, the micro-switch 64 is engaged by the actuator 68, and the valve 71 stops the introduction of air into the air lead 60, and the valve 70 introduces air into the air lead 38. This places the pressure plate 44 in position for the next cutting operation and starts the ratchet 35 in motion to advance the fabric 11 and start the sequence of operations over again.

It will be obvious to those skilled in the art that many variations may be made in the embodiment chosen for the purpose of illustrating the present invention without departing from the scope thereof as defined by the appended claims.

I claim:

1. An apparatus for cutting a fabric pattern from fabric material passed through the apparatus, said apparatus comprising, in combination, a fabric cutting means, said fabric cutting means having an anvil with a cutting surface between a first end and a second end and said fabric cutting means having a pressure plate positioned above the anvil parallel to the cutting surface of the anvil, vertically movable toward and away from the cutting surface of the anvil, and with a cutting edge extending uniformly below it and having a configuration substantially that of the fabric pattern; a continuous supporting belt having an upper surface and a portion of its length slidably movable toward the first end of the anvil, a portion of its length slidably movable beneath the anvil, and a portion of its length slidably movable away from the second end of the anvil; a continuous conveyor belt having a lower surface and having a portion of its length with its lower surface engaging and movable by the upper surface of that portion of the length of the supporting belt which is slidably movable toward the first end of the anvil, a portion of its length with its lower surface engaging and slidably movable by the upper surface of that portion of the length of the supporting belt which is slidably movable away from the second end of the anvil, and a portion of its length slidably movable across the anvil of the fabric cutting means between the anvil and the pressure plate; and pressure means for moving the pressure plate toward the anvil with sufficient force to pass the cutting edge through the fabric material.

2. An apparatus for repeatedly cutting the same fabric pattern from lengths of continuous fabric passed through the apparatus, said apparatus comprising, in combination, a fabric cutting means, said fabric cutting means having an anvil with a cutting surface lying in a horizontal plane between a first end and a second end and said fabric cutting means having a pressure plate positioned above the anvil parallel to the cutting surface of the anvil, vertically movable toward and away from the cutting surface of the anvil, and with a cutting edge extending uniformly below it and having a configuration substantially that of the fabric pattern; a continuous supporting belt having an upper surface and a portion of its length slidably movable toward the first end of the anvil, a portion of its length slidably movable beneath the anvil, and a portion of its length slidably movable away from the second end of the anvil; a continuous conveyor belt having a lower surface and having a portion of its length with its lower surface engaging and movable by the upper surface of that portion of the length of the supporting belt which is slidably movable toward the first of the anvil, a portion of its length with its lower surface engaging and slidably movable by the upper surface of that portion of the length of the supporting belt which is slidably movable away from the second end of the anvil, and a portion of its length slidably movable across the anvil of the fabric cutting means between the anvil and the pressure plate; pressure means for moving the pressure plate toward the anvil with sufficient force to pass the cutting edge through the fabric material; and means responsive to the motion of the pressure plate toward the anvil for subsequently moving the pressure plate away from the anvil and advancing the supporting belt a distance equal to the length of the fabric material from which the fabric pattern is to be cut.

3. An apparatus for cutting a fabric pattern from fabric passed through the apparatus, said apparatus comprising, in combination, a fabric cutting means having an anvil with a cutting surface, said cutting surface having a first edge and a second edge opposite the first edge; a first frame, said frame having a first portion extending away from the first edge of the cutting surface of the anvil and a second portion extending in the opposite direction away from the second edge of the cutting surface of the anvil; a second frame, said frame having a first portion extending away from the first edge of the cutting surface of the anvil and a second portion extending in the opposite direction away from the second edge of the cutting surface of the anvil; a plurality of feed rollers rotatably positioned between the first portion of the first frame and the first portion of the second frame; a plurality of discharge rollers rotatably positioned between the second portion of the first frame and the second portion of the second frame; a plurality of rotatable diverting rollers extending between the first frame and the second frame beneath the anvil; a continuous conveyor belt having a biased seam joining its ends and passing in succession over the feed rollers, the cutting surface of the anvil, and the discharge rollers; a continuous supporting belt passing in succession over the feed rollers between the feed rollers and the conveyor belt under the diverting rollers, and over the discharge rollers between the discharge rollers and the conveyor belt; and means for moving the supporting belt progressively under the anvil.

References Cited by the Examiner
UNITED STATES PATENTS

| | | | |
|---|---|---|---|
| Re. 17,085 | 9/1928 | Thomas | 83—547 X |
| 714,546 | 11/1902 | Wigtel | 83—639 |
| 1,672,190 | 6/1928 | Abbott | 83—547 X |
| 1,905,837 | 4/1933 | Flink | 83—155 X |
| 2,269,914 | 1/1942 | Parker | 83—639 |
| 2,539,401 | 1/1951 | Carl et al. | 83—155 X |
| 2,733,766 | 2/1956 | Wikle | 83—658 X |
| 2,783,837 | 3/1957 | Bridges et al. | 83—31 |
| 2,948,177 | 8/1960 | Arvidson | 83—155 |
| 3,024,688 | 3/1962 | Romm | 83—155 |

WILLIAM W. DYER, Jr., *Primary Examiner.*

ANDREW R. JUHASZ, *Examiner.*